United States Patent
Clark et al.

(10) Patent No.: US 7,870,264 B2
(45) Date of Patent: Jan. 11, 2011

(54) METHODS AND APPARATUS FOR PROVIDING COMMUNICATIONS FROM A PLURALITY OF NETWORK DEVICES TO A USER

(75) Inventors: Timothy P. Clark, Rochester, MN (US); Zachary A. Garbow, Rochester, MN (US); Richard Theis, Rochester, MN (US); Brian P. Wallenfelt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 11/335,762

(22) Filed: Jan. 19, 2006

(65) Prior Publication Data

US 2007/0165623 A1    Jul. 19, 2007

(51) Int. Cl.
*G06F 15/177* (2006.01)
*G06F 15/173* (2006.01)

(52) U.S. Cl. .................................. 709/227; 709/224
(58) Field of Classification Search ................ 709/203, 709/206, 207, 223, 224, 227
See application file for complete search history.

(56) References Cited

U.S. PATENT DOCUMENTS

| 6,463,462 B1 * | 10/2002 | Smith et al. ................. 709/206 |
| 6,650,739 B1 * | 11/2003 | Doeberl et al. .......... 379/88.18 |
| 7,269,432 B2 * | 9/2007 | Gress et al. ................. 455/466 |
| 7,461,378 B2 * | 12/2008 | Beyda ........................ 719/313 |
| 7,484,213 B2 * | 1/2009 | Mathew et al. .............. 718/100 |

* cited by examiner

*Primary Examiner*—Hussein A Elchanti
(74) *Attorney, Agent, or Firm*—Roy W. Truelson

(57) ABSTRACT

In a first aspect, a first method of providing communication to a user via one of a plurality of network devices is provided. The first method includes the steps of (1) receiving a plurality of communications for the user from one or more of the network devices in a message queue; (2) selecting a network device based on at least one of respective time thresholds and respective priorities associated with the plurality of network devices; and (3) determining whether the selected network device can receive a communication from the message queue based on at least one of a profile associated with the user adapted to define how the user receives the communication on one or more of the network devices and a ruleset adapted to define how the communication is handled based on criteria associated with the communication. Numerous other aspects are provided.

18 Claims, 4 Drawing Sheets

METHODS AND APPARATUS FOR
PROVIDING COMMUNICATIONS FROM A
PLURALITY OF NETWORK DEVICES TO A
USER

FIELD OF THE INVENTION

The present invention relates generally to network devices, and more particularly to methods and apparatus for providing communications from a plurality of network devices to a user.

BACKGROUND

Many devices exist on which a user can communicate via a network. Further, devices on which a user traditionally could not communicate via a network, such as automobiles, televisions and appliances, are now able to provide such communication. Consequently, a network user may be inundated with communications and may be burdened with checking numerous devices repeatedly for new communications. Accordingly, methods and apparatus for facilitating delivery of communications to a user are desired.

SUMMARY OF THE INVENTION

In a first aspect of the invention, a first method of providing communication to a user via one of a plurality of network devices is provided. The first method includes the steps of (1) receiving a plurality of communications for the user from one or more of the network devices in a message queue; (2) selecting a network device based on at least one of respective time thresholds and respective priorities associated with the plurality of network devices; and (3) determining whether the selected network device can receive the communication from the message queue based on at least one of a profile associated with the user adapted to define how the user receives the communication on one or more of the network devices and a ruleset adapted to define how the communication is handled based on criteria associated with the communication.

In a second aspect of the invention, a first apparatus for providing communication to a user via one of a plurality of network devices is provided. The first apparatus includes (1) a network adapted to couple the plurality of network devices; and (2) a first network device, including at least a portion of a message queue, coupled to the network. The first network device is adapted to (a) receive a plurality of communications for the user from one or more of the plurality of network devices in the message queue; (b) select a network device based on at least one of respective time thresholds and respective priorities associated with the plurality of network devices; and (c) determine whether the selected network device can receive the communication from the message queue based on at least one of a profile associated with the user adapted to define how the user receives the communication on one or more of the network devices and a ruleset adapted to define how the communication is handled based on criteria associated with the communication.

In a third aspect of the invention, a first system for providing communication to a user is provided. The first system includes (1) a network; and (2) a plurality of network devices coupled to the network. At least one of the plurality of network devices includes at least a portion of a message queue and is adapted to (a) receive a plurality of communications for the user from one or more of the plurality of network devices in the message queue; (b) select a network device based on at least one of respective time thresholds and respective priorities associated with the plurality of network devices; and (c) determine whether the selected network device can receive a communication from the message queue based on at least one of a profile associated with the user adapted to define how the user receives the communication on one or more of the network devices and a ruleset adapted to define how the communication is handled based on criteria associated with the communication.

In a fourth aspect of the invention, a first computer program product for providing communication to a user via one of a plurality of network devices coupled to a network is provided. The first computer program product includes a medium readable by a computer, the computer readable medium having computer program code adapted to cause at least one of the plurality of network devices to (1) receive a plurality of communications for the user from one or more of the plurality of network devices in a message queue of the at least one of the plurality of network devices; (2) select a network device based on at least one of respective time thresholds and respective priorities associated with the plurality of network devices; and (3) determine whether the selected network device can receive a communication from the message queue based on at least one of a profile associated with the user adapted to define how the user receives the communication on one or more of the network devices and a ruleset adapted to define how the communication is handled based on criteria associated with the communication. Numerous other aspects are provided, as are systems, apparatus and computer program products in accordance with these and other aspects of the invention. Each computer program product described herein may be carried by a medium readable by a computer (e.g., a floppy disc, a compact disc, a DVD, a hard drive, a random access memory, etc.).

Other features and aspects of the present invention will become more fully apparent from the following detailed description, the appended claims and the accompanying drawings.

DETAILED DESCRIPTION

The present invention provides improved methods and apparatus for providing communication from one or more network devices to a user. More specifically, the present invention employs a method in which one or more network devices may send a communication (e.g., a message, an alert or a notification) to a message queue. The message queue may be included in a centrally-located network device, such as a server, for example. Alternatively, one or more portions of the message queue may be distributed among the network devices. A device may be selected to receive a communication from the message queue. Such a device may be selected based on device activity (e.g., whether the device has been used within a preset threshold or time period). Additionally, the device may be selected based on a priority associated with the device. Preset thresholds and/or priorities associated with the plurality of network devices may be stored in a configuration file.

Once a device is selected, predefined user profiles and/or rulesets may be accessed to determine whether the communication may be sent to the selected device. A user profile may define how a user receives a communication on one or more of his network devices. A ruleset may define how a communication is handled based on criteria associated with the communication, such as communication priority, communication type, communication source, etc.). The user profiles and/or rulesets may also be stored in the configuration file. If a predefined user profile and/or ruleset indicates the selected device may receive the communication, the communication is sent from the message queue to the selected device. Alternatively, if the predefined user profile and/or ruleset indicates the selected device may not receive the communication, another device may be selected to receive the communication in the manner described above, and the user profiles and/or rulesets may be accessed to determine whether the communication may be sent to the selected device, and so on. In this manner, heterogenous messages from a plurality of devices may be sent to one or more users such that the users are not inundated with such communications and are not burdened with checking numerous devices repeatedly for the communications.

Figure 1:
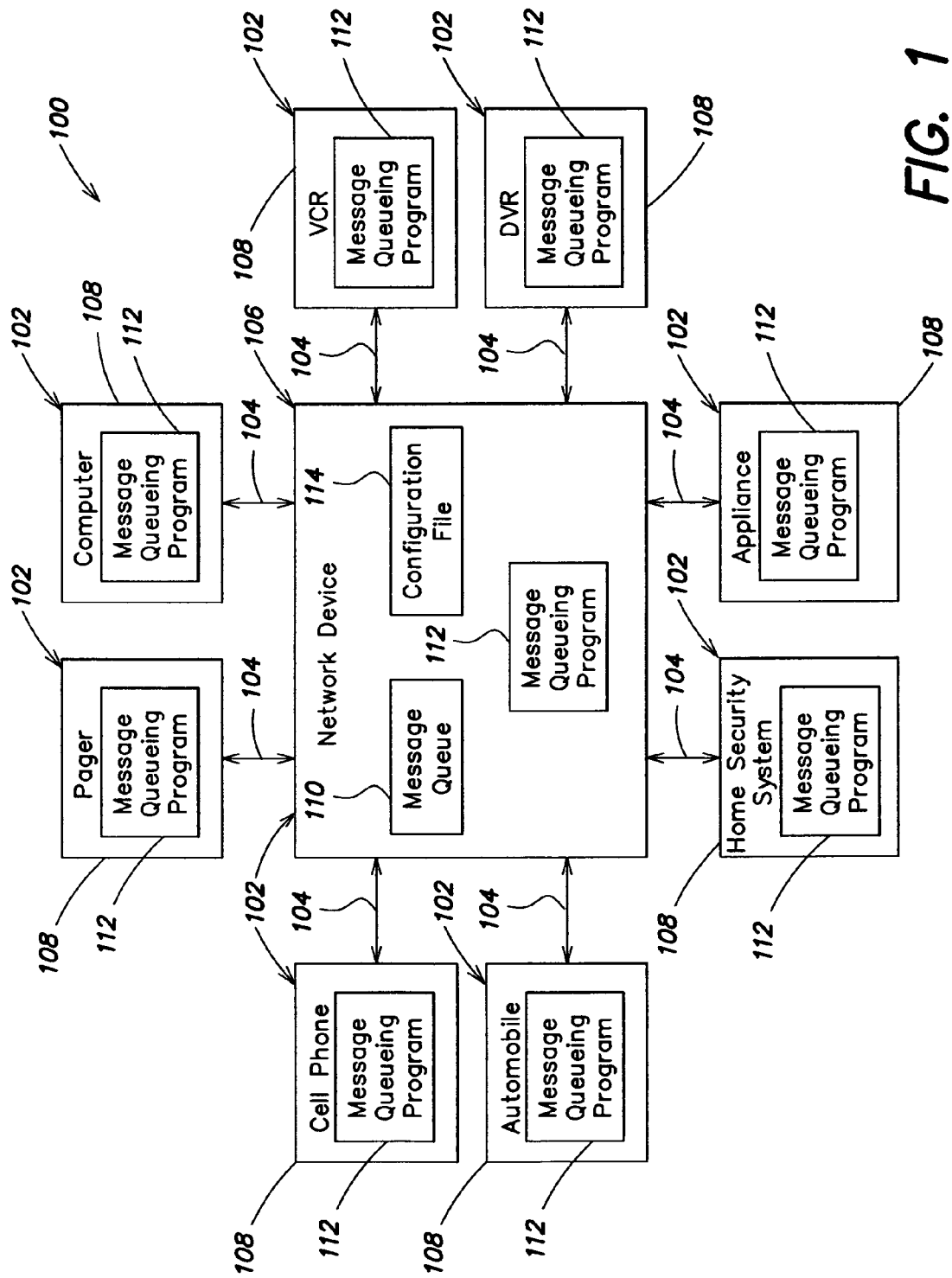
FIG. 1 illustrates a block diagram of a first exemplary system adapted to provide communication to a user from a plurality of network devices in accordance with an embodiment of the present invention.

FIG. 1 illustrates a block diagram of a first exemplary system 100 adapted to provide communication to a user from a plurality of network devices in accordance with an embodiment of the present invention. With reference to FIG. 1, the first exemplary system 100 may include a plurality of network devices 102 coupled via a network 104. The first exemplary system 100 may be a server model system. For example, a first network device 106 may be a centralized computer, server, or the like coupled to the network 104. The network 104 may be a wide area network (WAN), local area network (LAN) and/or the like. The network 104 may employ a single protocol, such as Ethernet, Token Ring or the like. Alternatively, the network 104 may collectively refer to a group of smaller networks two or more of which may employ different protocols. Remaining network devices 108 of the plurality of network devices 102 may be coupled to the first network device 106 via the network 104. One or more of the remaining network devices 108 may be a pager, computer, video cassette recorder (VCR), digital video recorder (DVR), an appliance, a home security system, an automobile, a cellular telephone (cell phone) and/or another suitable device.

The first network device 106 may include a message queue (MQ) 110 adapted to receive one or more communications from the plurality of network devices 102 and transmit such communications therefrom to one or more of the plurality of network devices 102. Further, each of the plurality of network devices 102 may include and/or execute code, such as a message queueing program (MQP) 112, adapted to provide communication to a user from the plurality of network devices 102 in accordance with exemplary methods described below. At least the first network device 106 may include a configuration file (CF) 114 that may be accessed by the message queueing program 112 to receive one or more communications from the plurality of network devices 102 and transmit such communication from the message queue 110 to one or more of the plurality of network devices 102 in accordance with exemplary methods described below.

Configuration of the first system 100 is exemplary, and therefore, the system 100 may employ a larger or smaller number of and/or different types of network devices. Further, such network devices may be coupled using the same or a different network configuration. Additionally or alternatively, in the first exemplary system 100, the MQ 110 and CF 114 may be located in a single network device 102, such as the first network device 106. However, in some embodiments such as the second exemplary system 200 (described below with reference to FIG. 2), the MQ 110 and/or CF 114 may be distributed among the plurality of network devices 102.

Figure 2:
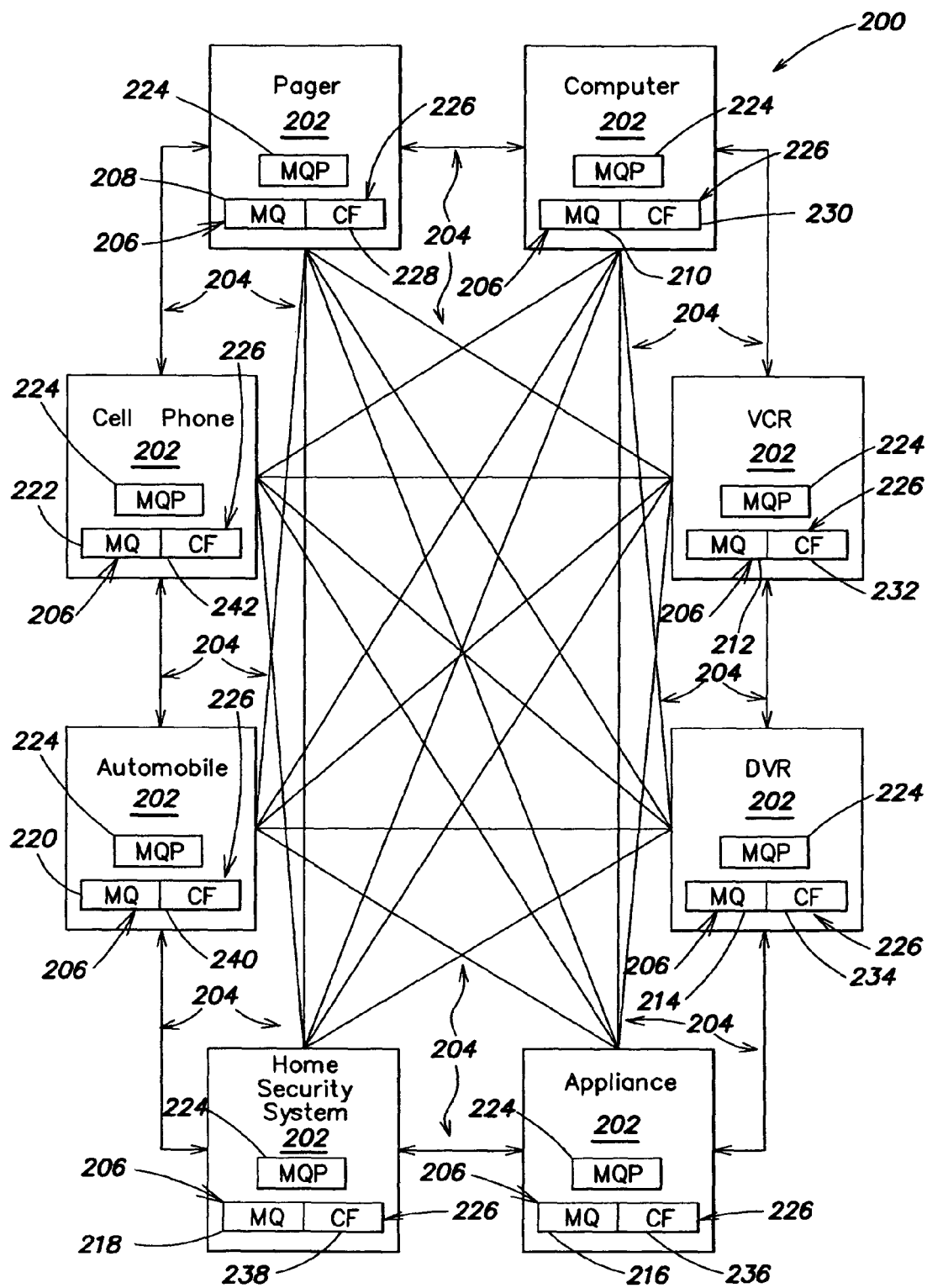
FIG. 2 illustrates a block diagram of a second exemplary system adapted to provide communication to a user from a plurality of network devices in accordance with an embodiment of the present invention.

FIG. 2 illustrates a block diagram of a second exemplary system 200 adapted to provide communication to a user from a plurality of network devices in accordance with an embodiment of the present invention. With reference to FIG. 2, the second exemplary system 200 may include a plurality of network devices 202 coupled via a network 204. The second exemplary system 200 may be a peer-to-peer (P2P) model system. The plurality of network devices 202 may be coupled together via the network 204. More specifically, each network device 202 may be coupled to one or more other network devices included in the plurality of network devices 202. One or more of the network devices 202 may be a pager, computer, VCR, DVR, an appliance, a home security system, an automobile, a cell phone and/or another suitable device.

As stated, in the first exemplary system 100, a single network device 102 may include an MQ 110 and CF 114. In contrast, in the second exemplary system 200, an MQ 206 adapted to receive one or more communications from the plurality of network devices 202 and transmit such messages therefrom to one or more of the plurality of network devices 202 may be distributed among two or more of the network devices 202. For example, each of the plurality of network devices 202 may include respective portions 208-222 of the MQ 206.

Further, each of the plurality of network devices 202 may include and/or execute code, such as a message queueing program (MQP) 224, adapted to provide communication to a user from the plurality of network devices 202 in accordance with exemplary methods described below. A configuration file (CF) 226, which may be accessed by the MQP 224 to receive one or more communications from the plurality of network devices 202 and transmit such messages from the MQ 206 to one or more of the plurality of network devices 202 in accordance with exemplary methods described below, may be distributed among two or more of the network devices 202. For example, each of the plurality of network devices 202 may include respective portions 228-242 of the CF 226. Alternatively, in some embodiments, one or more of the network devices 202 may include the entire CF 226.

Configuration of the second system 200 is exemplary, and therefore, the system 200 may employ a larger or smaller number of and/or different types of network devices. Further, such network devices may be coupled using the same or a different network configuration.

As use of the network devices 102, 202 (e.g., computing devices) described above becomes widespread (e.g., increasingly pervasive), allowing heterogenous communications from such network devices 102, 202 to demand an owner's attention at will is impractical. To retain value as autonomous service providers, the network devices 102, 202 should cooperate to provide a prioritized and intelligent distribution of communication (e.g., messages, notifications, alerts and/or the like). In operation, the first and second exemplary systems 100, 200 enable such cooperation among network devices 102, 202. In this manner, the present systems 102, 202 may serve as a broker between the demands of the network devices 102, 202 and an owner's attention. As described below, the present methods and apparatus may provide automatic queueing of heterogenous communications (e.g., from multiple network devices 102, 202) intended for a network device user, selection of a network device 102, 202 (e.g., a network device determined to be in closest proximity to the user) to receive a queued communication, and distribution of the communication to the user using the selected network device 102, 202. The user may create a customized ruleset adapted to control distribution of the communication based on criteria associated with the communication (e.g., message priority) which may include criteria associated with the destination device (e.g., the selected network device 102, 202). For example, the present methods and apparatus may enable various network devices, such as a cell phone, personal computer (PC), television (TV), microwave and/or the like to send communications to a centralized message queue (e.g., for a user or group of users of such devices). The message queue may be adapted to organize and manage communications based on a configuration file (e.g., which may be created by the user). The present methods and apparatus may then determine where to route a queued message based on the user configuration and location (e.g., proximity to network devices 102, 202 determined by usage). For example, a network device may be selected to receive the queued message based on a user's current or recent interaction with the network device 102, 202.

Figure 3:
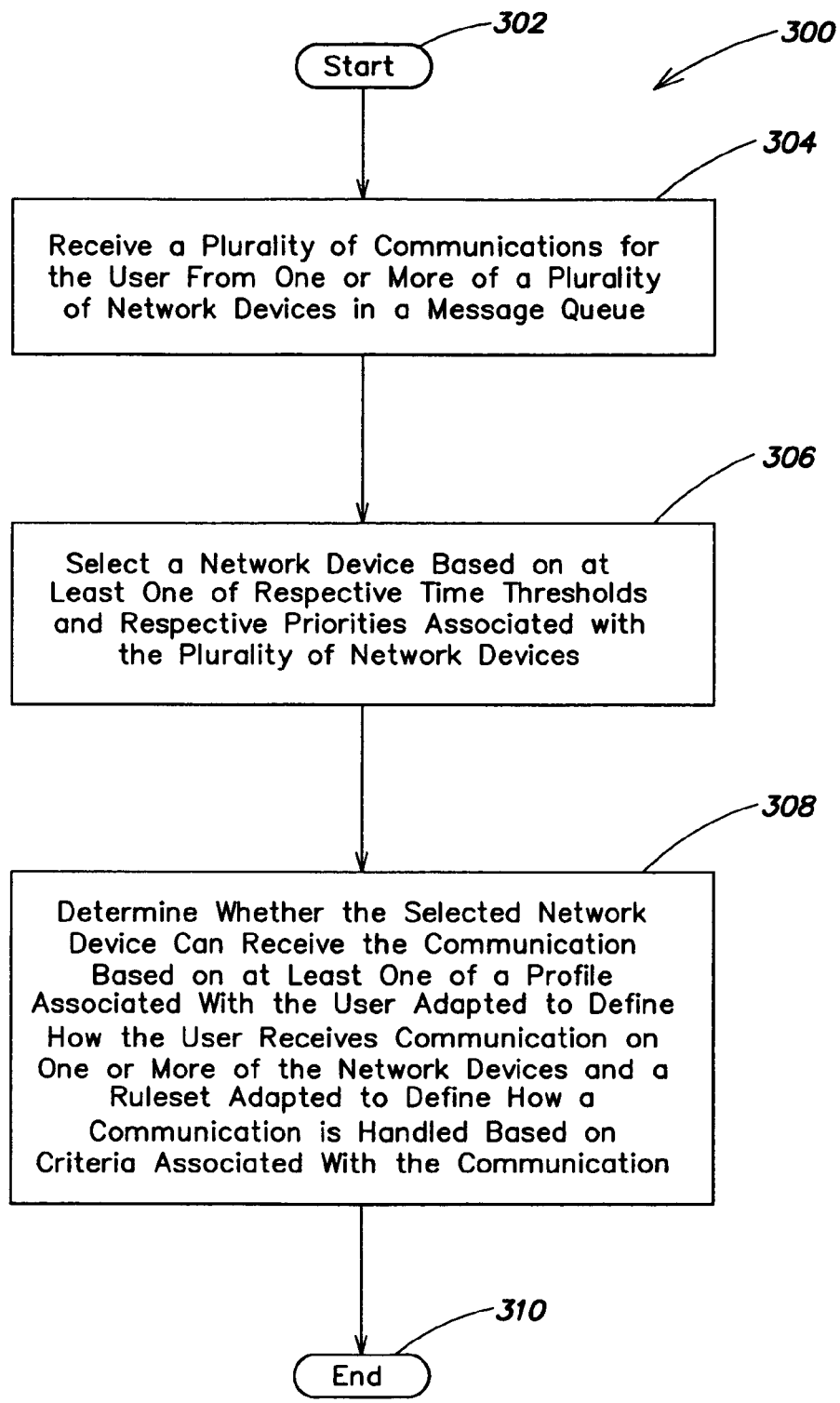
FIG. 3 illustrates a first exemplary method of providing communication to a user via one of a plurality of network devices in accordance with an embodiment of the present invention.
Figure 4:
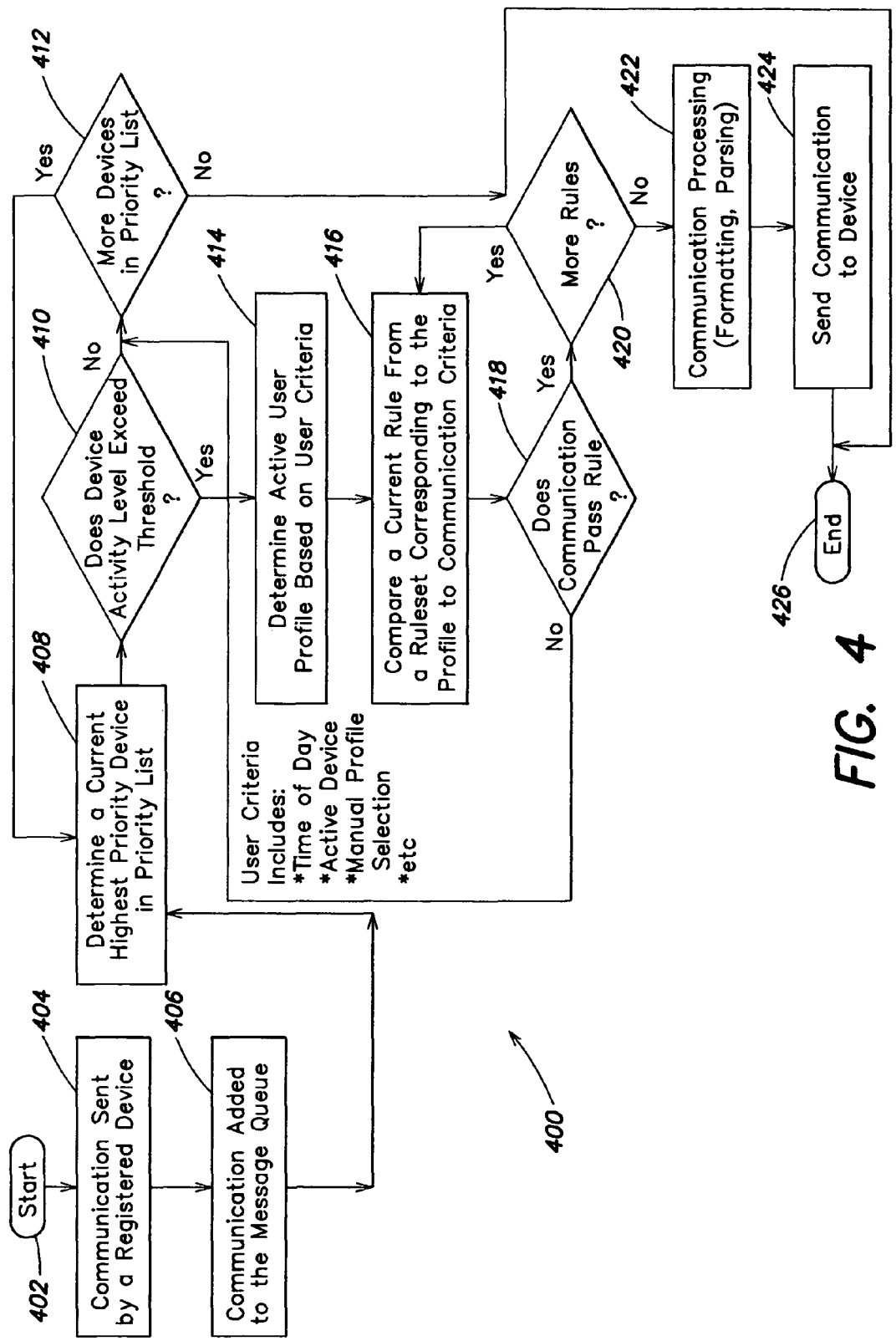
FIG. 4 illustrates a second exemplary method of providing communication to a user via one of a plurality of network devices in accordance with an embodiment of the present invention.

Details of operation of the first and second exemplary systems for 100, 200 are described below with reference to FIGS. 3 and 4 which illustrate first and second exemplary methods, respectively, of providing communication to a user via one of a plurality of network devices in accordance with an embodiment of the present invention. With reference to FIG. 3, in step 302, the method 300 begins. In step 304, a plurality of communications for the user from one or more network devices 102, 202 may be received in an MQ 110, 206. More specifically, as described above, the MQP 112, 224 may be loaded on and executed by each participating network device (e.g., the plurality of network devices 102, 202). The MQP 112, 224 may forward one or more communications from the network devices 102, 202, respectively, to the MQ 110, 206, which may be centralized in the first exemplary system 100 and distributed in the second exemplary system 200. In this manner, the network devices 102, 202 may communicate via a server model system or a P2P model system, respectively. Each communication transmitted to the MQ 110, 206 may be a message, alert, notification and/or the like from a network device 102, 202. Additionally, along with the communication, the network device 102, 202 may transmit criteria associated with the communication. In some embodiments, such criteria may be included in the communication. Criteria associated with the communication may include one or more of (1) network device(s) to which the communication is being sent (e.g., only messages of a certain type or a certain priority may be sent to a selected network device 102, 202); (2) network device that is the source of the message; (3) a message priority; (4) message sender, for example, a user who sent an e-mail or instant message (IM); (5) message genre (e.g., whether the message is an alert, notification, message and/or the like); (6) message type, for example, whether the communication is an e-mail, IM, page, a cell phone text message such as a short message service (SMS), aggregate Web data such as a really simple syndication (RSS) feed, etc.; (7) time of day of the communication; (8) network device activity (e.g., a time since a network device that is sending a communication was last used); (9) a message threshold associated with the network device sending the communication (e.g., no more than a predetermined number x of communications may be sent by the network device); (10) message length or format; and (11) message content (e.g., a keyword included therein). However, the criteria associated with a communication may include a larger or smaller number of and/or different standards.

Each network device 102, 202 may transmit one or more different types of communication to the MQ 110, 206. For example, a cell phone may transmit a communication such as a telephone call, a voice mail or an SMS message to the MQ 110, 206. A PC may transmit communication such as an IM, an RSS feed, a Website update (e.g., stock quotes, baseball scores, news headlines and/or the like) to the MQ 110, 206. A pager may transmit a communication such as a page to the MQ 110, 206. A TV may transmit a communication such as show progress (e.g., whether a show is in commercial break), meta data or keywords to the MQ 110, 206. An appliance may transmit a communication such as cooking timer information, car status information or other information indicating location of a user (e.g., a notification that a user's wife will be home in approximately 10 minutes) to the MQ 110, 206. The above communications from network devices 102, 202 to the MQ 110, 206 are exemplary, and therefore, one or more of the network devices 102, 202 may transmit a larger or smaller amount of and/or different types of communications to the MQ 110, 206. It is contemplated that the present invention may include any type of communication from any device which gains processing and communication capability in the future.

In step 306, a network device 102, 202 may be selected based on at least one of respective time thresholds and respective priorities associated with the plurality of network devices 102, 202. More specifically, the CF 114, 226 may include information about respective priorities of the network devices 102, 202, and therefore, information about relative priority of the plurality of network devices 102, 202. Additionally, the CF 114, 226 may include information about respective time thresholds of the plurality of network devices 102, 202. A time threshold associated with a network device 102, 202 may be employed to determine whether the device is active. For example, if a network device 102, 202 has been used within a time period indicated by the time threshold, the network device 102, 202 is active. Otherwise the device 102, 202 is inactive. To make such a determination, the plurality of network devices 102, 202 may communicate any user activity thereon to the central server (e.g., the first network device 106 of the server model system) or to each network device 202 for the P2P model system so the MQP 112, 224 may determine which network devices 102, 202 are currently being used or have most recently been used. In this manner, the present invention may avoid using GPS and/or RFID to communicate user activity on one or more of the plurality of network devices 102, 202.

To transmit a communication from the MQ 110, 206, the MQP 112, 224 may access the CF 114, 226 and select a network device 102, 202 based on at least one of the respective priorities associated with the network devices 102, 202 and respective time thresholds associated with the network devices 102, 202. In this manner, the MQP 112, 224 may select the highest-priority active network device 102, 202. By selecting such a device to receive the communication, the present methods and apparatus may broadcast the communication from the MQ 110, 206 only to one or more network devices 102, 202 which are deemed to be in use by the user, thereby reducing communications received by the user and decreasing user distraction. In this manner, the user's location may be determined (assuming the user is near the active network device). Therefore, if a user is watching TV and recently made a cell phone call, the TV and the cell phone may report such user activity information to the MQP 112, 224. Based on such information, the communication may be distributed to at least one of the TV and cell phone.

Alternatively, if the MQP 112, 224 determines no network devices 102, 202 are active (e.g., have been used recently), a network device 102, 202 may be selected based on the last used device, a device most likely to be near the user, such as a cell phone, or similar basis. Information about which devices are most likely to be near a user may be included in the CF 114, 226.

In step 308, it is determined whether the selected network device 102, 202 can receive a communication based on at least one of a profile associated with the user adapted to define how the user receives communication on one or more of the network devices 102, 202 and a ruleset adapted to define how a communication is handled based on criteria associated with the communication. For example, the CF 114, 226 may include one or more rulesets. Each ruleset may include one or more rules (or tests). To determine whether the selected network device 102, 202 may receive the communication, the MQP 112, 224 may determine whether the communication passes one or more (e.g., all) rules or tests of a selected ruleset. For example, each rule or test may include rule criteria that may be compared to criteria associated with the communication to determine whether the communication passes the rule or test. Rule criteria may include or be based on one or more of (1) network device(s) to which the communication is being sent (e.g., only messages of a certain type or a certain priority may be sent to a selected network device 102, 202); (2) network device that is the source of the message; (3) a message priority; (4) message sender (e.g., a user who sent an e-mail or instant message (IM)); (5) message genre (e.g., whether the message is an alert, notification, message and/or the like); (6) message type (e.g., whether the communication is an e-mail, IM, page, an SMS, an RSS feed, etc.); (7) an amount of time the communication has been in the queue; (8) time of day of the communication; (9) a combination of network devices being used; (10) network device activity (e.g., a time since a network device that is sending a communication was last used); (11) a message threshold associated with the network device sending the communication (e.g., no more than a predetermined number x of communications may be sent by the network device); (12) message length or format; and (13) message content (e.g., a keyword included therein). However, the rule criteria may include a larger or smaller amount of and/or different standards.

Additionally, the CF 114, 226 may include one or more user profiles that define how the user receives communication on one or more of the network devices 102, 202. For example, a user profile may be defined to correspond to a ruleset and be defined to be active when certain user criteria, such as a time of day, active devices, for example, are met. In this manner, a ruleset to be applied to the communication may be based on the active user profile. Alternatively, the user profile may be defined to indicate devices that may receive the communication.

Additionally, if it is determined in step 308 that the selected network device 102, 202 can receive the communication, the communication may be transmitted to the user using the selected network device 102, 202.

Alternatively, if it is determined in step 308 that the selected network device 102, 202 may not receive the communication, the MQP 112, 224 may select a different network device 102, 202 based on at least one of respective time thresholds and respective priorities associated with the plurality of network devices 102, 202 and the MQP 112, 224 may determine whether the selected different network device 102, 202 can receive the communication from the MQ 110, 206 based on at least one of a profile associated with the user adapted to define how the user receives the communication on one or more of the network devices and a ruleset adapted to define how the communication is handled based on criteria associated with the communication similar to the manner described above in step 308.

Thereafter, step 310 may be performed. In step 310, the method 300 ends. Through use of the present method 300, a user of network devices 102, 202 may avoid being inundated with communications and/or avoid being burdened with checking numerous network devices 102, 202 repeatedly for new communications. For example, by both selecting a network device 102, 202 and determining whether the selected network device 102, 202 can receive a communication as described above, a user may avoid information overload. Simply transmitting (e.g., broadcasting) queued messages to the nearest network device(s) 102, 202 may not solve the problem of information overload. In fact, by merely transmitting queued messages to the nearest network device 102, 202, the user may receive unnecessary communication on one or more network devices 102, 202. By employing one or more of the profiles and/or rulesets described above, the present methods and apparatus may avoid distracting the user with a communication if such communication is irrelevant given the user's current activity. For example, if the user is watching TV (e.g., as indicated by a communication sent by the TV to the server 106), the system 200 may not send an e-mail to the user. In this manner, the profiles and/or rulesets may be combined with active device location to provide communication from a queue to a user via one of a plurality of network devices 102, 202.

The present invention may include additional methods of providing communication to a user via one of a plurality of network devices 102, 202. FIG. 4 illustrates a second exemplary method of providing communication to a user via one of a plurality of network devices 102, 202 in accordance with an embodiment of the present invention. With reference to FIG. 4, in step 402, the method 400 begins. In step 404, a communication may be sent by a registered device. A registered device may be a network device 102, 202 as described above. For example, the MQP 112, 224 of a PC may communicate with the MQP 112, 224 of a server 106 in the server model system, or the MQP 112, 224 of another network device 202 in the P2P model system, such that the PC may send a communication, such as an e-mail, along with criteria associated with the e-mail to the server 106 in the server model system, or to the other network device 202 in the P2P model system.

In step 406, the communication may be added to an MQ 110, 206. More specifically, the communication may be added to the MQ 110 or a portion 208-222 of the MQ 206 included in the network device 102, 202 to which the communication is sent.

In step 408, a current highest priority device 102, 202 in a priority list may be determined. More specifically, the MQP 112, 224 may access priority information associated with the network devices 102, 202 included in the CF 114, 226 to determine the current highest priority device 102, 202.

In step 410, the system 100, 200 (e.g., the MQP 112, 224 thereof) may determine whether an activity level of the device 102, 202 exceeds a threshold. More specifically, the MQP 112, 224 may compare the time threshold associated with the current network device 102, 202, which may be stored in the CF 114, 226, with the user activity on the device 102, 202 (as reported by the current device to the MQP 112, 224). In this manner, the system 100, 200 may determine whether the current device 102, 202 is active.

If the activity level of the device 102, 202 does not exceed the threshold, the device 102, 202 may not be active, and therefore, the communication should be sent to another device 102, 202. Consequently, step 412 may be performed, in which the system 100, 200 may determine whether the priority list includes additional network devices 102, 202. The system 100, 200 may access the CF 114, 226 to determine whether the priority list includes additional network devices 102, 202. If the priority list includes additional network devices 102, 202, step 408 may be performed to determine a current (e.g., the next) highest priority device in the priority list. However, if the priority list does not include additional network devices 102, 202, none of the plurality of network devices 102, 202 are active, and therefore, none of the network devices 102, 202 may receive the communication. Consequently, step 426 may be performed in which the method 400 ends. Alternatively, in some embodiments, if the priority list does not include additional network devices 102, 202, the system 100, 200 may increase a time threshold associated with one or more of the network devices 102, 202, and thereafter, step 408 may be performed.

Alternatively, if, in step 410, the activity level of the device 102, 202 does exceed the threshold, the device 102, 202 is active, and therefore, the communication may be sent to the current network device 102, 202. In this manner, the current network device 102, 202 may be selected. Consequently, step 414 may be performed. In step 414, the system 100, 200 may determine an active user profile. The active user profile may define how a user receives communications on the plurality of network devices 102, 202. The system 100, 200 may determine the active user profile based on user criteria, such as a time of day (e.g., of the communication), currently active devices (e.g., device usage), etc. Alternatively, in some embodiments, the user may manually select an active profile. Further, in some embodiments, priorities may be associated with profiles, respectively, and the active profile may be selected based on such priorities. Once the system 100, 200 determines an active user profile, step 416 may be performed.

In step 416, the system 100, 200 may compare a current rule from a ruleset corresponding to the profile to criteria associated with the communication. More specifically, the system 100, 200 may access the CF 114, 226 to determine the ruleset associated with the active profile and the one or more rules included in the ruleset. The system 100, 200 may select a first rule in the ruleset as the current rule. The system 100, 200 may apply the current rule to the communication by comparing rule criteria with criteria associated with the communication.

In step 418, the system 100, 200 may determine whether the communication passes the current rule. More specifically, the system 100, 200 may determine whether criteria of the current rule compares favorably (e.g., complies) with criteria associated with the communication. If the system 100, 200 determines the communication passes the current rule, step 420 may be performed. In step 420, the system 100, 200 may determine whether the ruleset includes additional rules. The system 100, 200 may access the CF 114, 226 to determine whether the ruleset includes additional rules. If the ruleset includes additional rules, step 416 may be performed so that a current rule (e.g., the next rule) from the ruleset may be compared to the criteria associated with the communication. In this manner, all rules of the ruleset may be applied to communication. Alternatively, if, in step 420, the system 100, 200 determines the ruleset does not include additional rules, the communication has passed all rules of the ruleset associated with the active profile, and therefore, step 422 may be performed.

In step 422, the system 100, 200 may process the communication. For example, the MQP 112, 224 may format and/or parse the communication so it may be received and displayed by the selected network device 102, 202.

In step 424, the system 100, 200 may send the communication to the selected network device 102, 202. For example, the MQP 112, 224 may send the communication from the MQ 206 to the selected network device 102, 202. Thereafter, step 426 may be performed in which the method ends.

Alternatively, in step 418, if the system 100, 200 determines the communication does not pass the current rule, step 412 may be performed. Step 412 is described above, and therefore, is not described again in detail herein.

Similar to the first exemplary method 300, through use of the second exemplary method 400, a user of network devices 102, 202 may avoid being inundated with communications and/or avoid being burdened with checking numerous network devices repeatedly for new communications.

EXEMPLARY SCENARIO

A user, Fred, may employ the system 100, 200 to define an "after-hours" profile that may be active based on time of day and/or device usage. For example, the "after-hours" profile may be active after 5 p.m. and when Fred's work PC reports being inactive. In this manner, the "after-hours" profile may be defined to be active when Fred leaves work. Alternatively, Fred may manually select the "after-hours" profile as he leaves work. Additionally, Fred may customize a ruleset including rules associated with the "after-hours" profile. Therefore, when the "after-hours" profile is active, Fred may receive communications on his network devices 102, 202 based on such a customized ruleset. For example, the customized ruleset may enable Fred to only receive top priority communications (e.g., communications from Fred's manager or pages) on his nearest network device (e.g., the highest-priority active device), such as his cell phone, TV and/or the like.

Additionally, Fred may define a "leisure" profile that may be active when Fred is watching TV (e.g., when the TV is active) and no other network devices 102, 202 report activity. Alternatively, Fred may manually select the "leisure" profile. Additionally, Fred may customize a ruleset including rules associated with the "leisure" profile. Therefore, when the "leisure" profile is active, Fred may receive communications on his network devices 102, 202 based on his customized ruleset. For example, the customized ruleset may prevent nearly all low priority messages from being distributed from the MQ 110, 206. Further, such a customized ruleset may enable appliance alerts/notifications to be transmitted to Fred on one of his network devices 102, 202. In this manner, Fred may only receive a high-priority alert, such as a work-related Severity 1 page and/or a notification on his TV from his oven that his dinner is done cooking.

As illustrated by the above scenario, the present invention may be useful in today's society in which pervasive computing is becoming a reality (e.g., with mobile devices becoming ubiquitous). Further, in today's society, devices (e.g., TVs, appliances, cameras and/or the like) that traditionally had a single function have gained central processing units (CPUs) and/or wireless communication capabilities. In this society, each device owned by a user increasingly demands his attention in unique ways beyond multi-sourced inundation of communications such as e-mails, IMs, pagers, SMSs, phone calls and/or the like. Additionally, associated with each new device that acquires communication capabilities is the burden of tracking communications and priorities thereof. Such burden may be increased if respective locations of such devices are distributed, because the user must attempt to stay within reach of all the devices which demand their attention. More specifically, the present invention may prevent the user from being inundated with such communications and burdened with checking numerous devices repeatedly for the communications. The present invention may provide a multi-part approach to managing heterogenous messages from multiple network devices 102, 202 (e.g., in a distributed environment). Each such network device 102, 202 may send communications therefrom to the MQ 110, 206. A device 102, 202 may be selected to receive the communication based on user activity on the devices 102, 202 based on reports to the MQP 224 from such devices 102, 202. One or more user-configured profiles and/or rulesets may be employed to define how such a communication is handled (e.g., prioritized). When used in conjunction, selection of a device 102, 202 based on user activity and the profiles and/or rulesets may provide a valuable solution to manage the rapidly increasing number of attention-demanding communications.

The foregoing description discloses only exemplary embodiments of the invention. Modifications of the above disclosed apparatus and methods which fall within the scope of the invention will be readily apparent to those of ordinary skill in the art. For instance, features of the first and second systems 100, 200 are exemplary, and therefore, such systems may include a larger or smaller number of and/or different features. It is contemplated that the system 100, 200 may not be 100% accurate in distributing communications to a user via an appropriate device 100, 200. For example, the system 100, 200 may send a communication to the user on a cell phone because the user recently made a call using the cell phone. However, the user may have left his cell phone somewhere (e.g., on a table) after making the call but before the communication is sent thereto. Consequently, such communication may not be seen by the user. Therefore, in some embodiments, the present methods and apparatus may enable the system 100, 200 (e.g., a server 106 included therein) to monitor or track the MQ 110, 206 and communications transmitted therefrom which remain unread. Further, in such embodiments, the system 100, 200 may provide a "show unseen/unread communications" option that may enable the user to access such unread communications at any time from any network device 102, 202.

Additionally, in some embodiments, the present methods and apparatus may enable the system 100, 200 to forward a communication, which was sent from the MQ 110, 206 to a first network device, to a second network device if the communication is unread for a predetermined time period on the first network device. For example, in such embodiments, the system 100, 200 may detect a communication sent to an initial network device 102, 202 is unread thereon for a predetermined number of minutes. Consequently, the system 100, 200 may determine the "next closest" device 102, 202 (e.g., the next highest-priority device) by accessing the CF 114, 226, remove the communication from the initial device 102, 202 and send the communication to the "next closest" device 102, 202. In this manner, the system 100, 200 may "track down" a user and send the communication to the user via a network device 102, 202. Such a feature may be useful for distributing high-priority communications. A user may configure the system 100, 200 to employ such feature only for specified communications so the user is not "tracked down" for every communication.

Further, during system operation, some communications in the MQ 110, 206 may be unable to pass rules of a ruleset, and therefore, may not exit the queue 110, 206. However, in some embodiments, the system 100, 200 may enable a user to access all communications (e.g., such communications in the queue 110, 206) on-demand. Such accessed communications may still be available via the communications' original applications (e.g., e-mails accessed on-demand are retained in an e-mail inbox).

Additionally, in some embodiments, the system 100, 200 may consider a confidentiality associated with a communication. For example, rulesets may include confidentiality information as a rule criteria and communication criteria may include confidentiality information. More specifically, a communication may be associated with communication criteria that may indicate the message is personal or confidential. Additionally, a ruleset may be customized to define which network devices 102, 202 may receive personal or confidential communications. For example, a ruleset may be created to prevent transmission of a personal or confidential communication to a shared network device 102, 202. A shared device refers to a network devices 102, 202 found in certain environments, such as a family home, that may be shared by multiple people.

Further, an important communication sent to a shared network device may be received by an incorrect user. Consequently, in some embodiments, the present systems 100, 200 may employ one or more rules to handle such a situation.

For example, in some embodiments, the system 100, 200 may employ one or more rules that enable the incorrect recipient of the communication to choose an option "forward to next device" which may send the communication to an estimated next closest device 102, 202 (as determined by respective time thresholds corresponding to network devices 102, 202 and reported activity of the network devices 102, 202). The communication sent to the next closest device 102, 202 may also remain in the MQ 110, 206 as "unread" and may be accessed on-demand by the intended recipient.

Additionally or alternatively, the system 100, 200 may employ one or more rules that may require a recipient of a communication to provide a password (e.g., a user-specific password) before the communication may be marked as "read". Such a rule may be useful to ensure an important or confidential communication is read by an intended recipient.

Additionally or alternatively, the system 100, 200 may employ one or more rules that may determine a user of a network device 102, 202 based on how the network device 102, 202 is being used. For example, if a user of a Web-enabled device is browsing finance blogs (e.g. Web logs), such rules may determine Fred is the user. Alternatively, if the user of the device 102, 202 is browsing cartoon sites, the rules may determine Fred's child is the user of the device 102, 202. The system 100, 200 may employ such information to route a communication to an intended recipient correspondingly.

Further, in some embodiments, the system 100, 200 may reformat a communication to fit a device that is selected to receive it. For instance, the communication would appear differently on a pager as opposed to on a TV.

In the method described above, it is determined whether a communication passes all rules of a ruleset. However, in some embodiments, if the communication passes one rule of the ruleset, the communication may be sent to the selected network device 102, 202. Remaining rules in the ruleset may be skipped. For example, assume rule "Is priority critical?" is compared with criteria associated with the communication. In this case, if the priority of the message is critical, the message may be sent to the selected network device regardless of other rules in the same ruleset. In this manner, in such embodiments, only a single rule of a ruleset may need to be complied with in order for message transmission.

Accordingly, while the present invention has been disclosed in connection with exemplary embodiments thereof, it should be understood that other embodiments may fall within the spirit and scope of the invention, as defined by the following claims.

The invention claimed is:

1. A method of providing communication to a user via one of a plurality of network devices, comprising:
   receiving a plurality of communications for the user from one or more of the network devices in a message queue;
   with respect to each of said plurality of communications, selecting a respective network device for presenting the respective communication to said user based at least in part on a respective activity level of the selected network device, wherein selecting a respective network device for presenting the respective communication to said user is performed before the respective communication is transmitted to the selected device and before the respective communication is presented to said user, the respective activity level not including activity responsive to the respective communication; and
   with respect to each of said plurality of communications, determining whether the respective selected network device can receive the respective communication from the message queue for presentation to said user based on at least one of a profile associated with the user adapted to define how the user receives the communication from the message queue on one or more of the network devices and a ruleset adapted to define how the communication is handled based on criteria associated with the communication, wherein determining whether the selected network device can receive the respective communication from the message queue is performed before the respective communication is transmitted to the selected device and before the respective communication is presented to said user; and
   with respect to each of said plurality of communications, transmitting the respective communication to the respective selected network device for presentation to said user responsive to determining that the respective selected network device can receive the respective communication from the message queue for presentation to said user based on at least one of a profile associated with the user adapted to define how the user receives the communication from the message queue on one or more of the network devices and a ruleset adapted to define how the communication is handled based on criteria associated with the communication.

2. The method of claim 1 further comprising monitoring a read status of the communication transmitted to the selected network device.

3. The method of claim 2 further comprising, if the read status of the communication transmitted to the selected network device indicates the message is unread for a predetermined time period, transmitting the communication to another network device.

4. The method of claim 1 further comprising accessing the communication transmitted to the selected network device using another network device.

5. The method of claim 1 wherein the ruleset corresponds to the profile associated with the user.

6. The method of claim 1 wherein:
   the ruleset includes one or more rules; and
   determining whether the selected network device can receive the communication from the message queue based on at least one of a profile associated with the user adapted to define how the user receives the communication on one or more of the network devices and a ruleset adapted to define how the communication is handled based on criteria associated with the communication includes determining whether the communication passes one or more rules of the ruleset.

7. The method of claim 1 further comprising, responsive to determining that the respective selected network device cannot receive the respective communication from the message queue for presentation to said user:
   selecting a respective alternate network device for presenting the respective communication to said user based at least in part on at least one of the respective activity level of the alternate network device and respective priorities of each of said network devices, wherein selecting a respective alternate network device for presenting the respective communication to said user is performed before the respective communication is transmitted to the alternate device and before the respective communication is presented to said user, the respective activity level not including activity responsive to the respective communication; and
   determining whether the respective selected alternate network device can receive the respective communication from the message queue for presentation to said user based on at least one of said profile associated with the user adapted to define how the user receives the communication from the message queue on one or more of the network devices and said ruleset adapted to define how the communication is handled based on criteria associated with the communication, wherein determining whether the selected alternate network device can receive the respective communication from the message queue is performed before the respective communication is transmitted to the alternate device and before the respective communication is presented to said user.

8. The method of claim 1 wherein criteria associated with the communication indicates confidentiality of the communication.

9. The method of claim 1, wherein selecting a respective network device for presenting the respective communication to said user is further based in part on a respective priority assigned to each of the network devices.

10. An apparatus for providing communication to a user via one of a plurality of network devices, comprising:
    a network adapted to couple the plurality of network devices; and
    a first network device, including at least a portion of a message queue, coupled to the network;
    wherein the first network device is adapted to:
    receive a plurality of communications for the user from one or more of the plurality of network devices in the message queue;
    with respect to each of said plurality of communications, select a respective network device for presenting the respective communication to said user based at least in part on a respective activity level of the selected network device, wherein the first network device selects a respective network device for presenting the respective communication to said user before the respective communication is transmitted to the selected device and before the respective communication is presented to said user, the respective activity level not including activity responsive to the respective communication;

with respect to each of said plurality of communications, determine whether the respective selected network device can receive the respective communication from the message queue for presentation to said user based on at least one of a profile associated with the user adapted to define how the user receives the communication on one or more of the network devices and a ruleset adapted to define how the communication is handled based on criteria associated with the communication, wherein the first network device determines whether the selected network device can receive the respective communication from the message queue before the respective communication is transmitted to the selected device and before the respective communication is presented to said user; and with respect to each of said plurality of communications, transmit the respective communication to the respective selected network device for presentation to said user responsive to determining that the respective selected network device can receive the respective communication from the message queue for presentation to said user based on at least one of a profile associated with the user adapted to define how the user receives the communication on one or more of the network devices and a ruleset adapted to define how the communication is handled based on criteria associated with the communication.

11. The apparatus of claim 10 wherein the first network device is further adapted to, if the selected network device cannot receive the respective communication:

select a respective alternate network device for presenting the respective communication to said user based at least in part on at least one of the respective activity level of the alternate network device and respective priorities of each of said network devices, wherein the first network device selects a respective alternate network device for presenting the respective communication to said user before the respective communication is transmitted to the alternate device and before the respective communication is presented to said user, the respective activity level not including activity responsive to the respective communication; and determine whether the respective selected alternate network device can receive the respective communication from the message queue for presentation to said user based on at least one of said profile associated with the user adapted to define how the user receives the communication on one or more of the network devices and said ruleset adapted to define how the communication is handled based on criteria associated with the communication, wherein the first network device determines whether the selected alternate network device can receive the respective communication from the message queue before the respective communication is transmitted to the alternate device and before the respective communication is presented to said user.

12. The apparatus of claim 10 wherein a respective network device for presenting the respective communication to said user is selected further based in part on a respective priority assigned to each of the network devices.

13. A system for providing communication to a user, comprising:

a network; and a plurality of network devices coupled to the network;

wherein at least one of the plurality of network devices includes at least a portion of a message queue and is adapted to:

receive a plurality of communications for the user from one or more of the plurality of network devices in the message queue;

with respect to each of said plurality of communications, select a respective network device for presenting the respective communication to said user based at least in part on a respective activity level of the selected network device, wherein a respective network device for presenting the respective communication to said user is selected before the respective communication is transmitted to the selected device and before the respective communication is presented to said user, the respective activity level not including activity responsive to the respective communication;

with respect to each of said plurality of communications, determine whether the respective selected network device can receive the respective communication from the message queue for presentation to said user based on at least one of a profile associated with the user adapted to define how the user receives the communication on one or more of the network devices and a ruleset adapted to define how the communication is handled based on criteria associated with the communication, wherein whether the selected network device can receive the respective communication from the message queue is determined before the respective communication is transmitted to the selected device and before the respective communication is presented to said user; and with respect to each of said plurality of communications, transmit the respective communication to the respective selected network device for presentation to said user responsive to determining that the respective selected network device can receive the respective communication from the message queue for presentation to said user based on at least one of a profile associated with the user adapted to define how the user receives the communication on one or more of the network devices and a ruleset adapted to define how the communication is handled based on criteria associated with the communication.

14. The system of claim 13 wherein the at least one of the plurality of network devices is further adapted to, if the selected network device cannot receive the respective communication:

select a respective alternate network device for presenting the respective communication to said user based at least in part on at least one of the respective activity level of the alternate network device and respective priorities of each of said network devices, wherein the respective alternate network device for presenting the respective communication to said user is selected before the respective communication is transmitted to the alternate device and before the respective communication is presented to said user, the respective activity level not including activity responsive to the respective communication; and determine whether the respective selected alternate network device can receive the respective communication from the message queue for presentation to said user based on at least one of said profile associated with the user adapted to define how the user receives the communication on one or more of the network devices and said ruleset adapted to define how the communication is handled based on criteria associated with the communication, wherein whether the selected alternate network device can receive the respective communication from the message queue is determined before the respective communication is transmitted to the alternate device and before the respective communication is presented to said user.

15. The system of claim 13 wherein a respective network device for presenting the respective communication to said user is selected further based in part on a respective priority assigned to each of the network devices.

16. A computer program product for providing communication to a user via one of a plurality of network devices coupled to a network, comprising:
a non-transitory computer readable medium storing computer program code, when executed by a computer cause at least one of the plurality of network devices to:
receive a plurality of communications for the user from one or more of the plurality of network devices in a message queue of the at least one of the plurality of network devices;
with respect to each of said plurality of communications, select a respective network device for presenting the respective communication to said user based at least in part on a respective activity level of the selected network device, wherein a respective network device presenting the respective communication to said user is selected before the respective communication is transmitted to the selected device and before the respective communication is presented to said user, the respective activity level not including activity responsive to the respective communication;
with respect to each of said plurality of communications, determine whether the respective selected network device can receive the respective communication from the message queue for presentation to said user based on at least one of a profile associated with the user adapted to define how the user receives the communication on one or more of the network devices and a ruleset adapted to define how the communication is handled based on criteria associated with the communication, wherein whether the selected network device can receive the respective communication from the message queue is determined before the respective communication is transmitted to the selected device and before the respective communication is presented to said user; and
with respect to each of said plurality of communications, transmit the respective communication to the respective selected network device for presentation to said user responsive to determining that the respective selected network device can receive the respective communication from the message queue for presentation to said user based on at least one of a profile associated with the user adapted to define how the user receives the communication on one or more of the network devices and a ruleset adapted to define how the communication is handled based on criteria associated with the communication.

17. The computer program product of claim 16 wherein the computer program code is further adapted to, if the selected network device cannot receive the respective communication:
select respective alternate network device for presenting the respective communication to said user based at least in part on at least one of the respective activity level of the alternate network device and respective priorities of each of said network devices, wherein the a respective alternate network device for presenting the respective communication to said user is selected before the respective communication is transmitted to the alternate device and before the respective communication is presented to said user, the respective activity level not including activity responsive to the respective communication; and
determine whether the respective selected alternate network device can receive the respective communication from the message queue for presentation to said user based on at least one of said profile associated with the user adapted to define how the user receives the communication on one or more of the network devices and said ruleset adapted to define how the communication is handled based on criteria associated with the communication, wherein whether the selected alternate network device can receive the respective communication from the message queue is determined before the respective communication is transmitted to the alternate device and before the respective communication is presented to said user.

18. The computer program product of claim 16 wherein a respective network device for presenting the respective communication to said user is selected further based in part on a respective priority assigned to each of the network devices.

* * * * *